United States Patent [19]

Temple

[11] Patent Number: 5,130,197
[45] Date of Patent: Jul. 14, 1992

[54] GLASS FIBERS FOR REINFORCING POLYMERS

[75] Inventor: Chester S. Temple, McKees Rocks, Pa.

[73] Assignee: PPG Industries, Inc., Pittsburgh, Pa.

[21] Appl. No.: 590,320

[22] Filed: Sep. 28, 1990

Related U.S. Application Data

[60] Continuation of Ser. No. 860,400, May 7, 1986, abandoned, which is a division of Ser. No. 715,841, Mar. 25, 1985, abandoned.

[51] Int. Cl.$^5$ .............................................. D02G 3/00
[52] U.S. Cl. ................................. 428/378; 428/375; 428/391; 428/392
[58] Field of Search ............... 428/375, 378, 391, 392, 428/341, 343, 344

[56] References Cited

U.S. PATENT DOCUMENTS

| | | | |
|---|---|---|---|
| T917,009 | 12/1973 | Meyer et al. | |
| 4,283,322 | 8/1981 | Temple | 428/391 |
| 4,370,157 | 1/1983 | Barch et al. | 428/429 |
| 4,370,439 | 1/1983 | Melle et al. | 428/375 |
| 4,413,085 | 11/1983 | Temple | 428/378 |
| 4,457,970 | 7/1984 | Das et al. | 428/392 |
| 4,608,304 | 8/1986 | Rosthauser | |

Primary Examiner—Lorraine T. Kendell
Attorney, Agent, or Firm—Kenneth J. Stachel

[57] ABSTRACT

Glass fibers are prepared with a chemical treatment resulting in chemically treated glass fibers having utility in reinforcing thermoplastic polymers such as polyolefins. The chemically treated glass fibers have a dried residue of an aqueous chemical treating composition having one or more amino organo coupling agents, an aqueous emulsion of an acid or anhydride modified polyolefin having one or more surfactants, wherein the polyolefin is neutralized with an organic or inorganic base with a basicity less than the basicity of the amino moiety of the coupling agent, a binder stabilizer, one or more film forming polymers, and water. The aqueous chemical treating composition is essentially free of cationic lubricants that are amidated fatty acids and polyvinyl acetate homopolymer. The chemically treated glass fibers can be prepared in a wet chop or dry chop process, wherein the chopped glass fiber strands eventually have a moisture content of less than 20 weight percent prior to volatilization of the formed moisture. The chemically treated glass fibers are used to reinforce thermoplastic polymers such as polyolefins and particularly polypropylene in any molding operation to produce glass fiber reinforced thermoplastic articles.

10 Claims, 4 Drawing Sheets

GLASS FIBERS FOR REINFORCING POLYMERS

This application is a continuation of application Ser. No. 06/860,400, filed May 7, 1986, and now abandoned which is a division of application Ser. No. 06/715,841, filed Mar. 25, 1985, and now abandoned.

BACKGROUND OF THE INVENTION

The present invention relates to chemically treated glass fibers for reinforcing polymeric matrices in producing reinforced polymers or plastics. More particularly, the present invention is directed to chopped, chemically treated glass fibers and strands for use in reinforcing polyolefin polymeric matrices to produce glass fiber reinforced polymers or plastics.

Glass fibers as continuous fibers, strands and rovings and chopped fibers and strands have been used to reinforce various polymeric matrices and have been useful in reinforcing polyolefins. The fibers usually are treated during their formation with a chemical treating composition usually referred to as a sizing composition to protect the fibers in subsequent processing and to assist the fibers in adhering with the polymeric matrix.

Polymers of the alpha-olefin, monomer type such as polypropylene that are to be reinforced with glass fibers exist in several stereo isometric forms. The term "polypropylene polymers" is inclusive of all polymers derived from propylene whether essentially amorphous or essentially crystalline, and including copolymers such as block copolymers of propylene with one or more other monomers. In addition, polyolefins that are to be reinforced with glass fibers have been developed that are propylene acid compounds and that are blends of isotactic and amorphous polypropylenes. Illustrative examples of the polypropylene acid compounds are acid-modified propylene polymers such as those taught in U.S. Pat. Nos. 3,416,990 (Robinson); and 3,437,550 (Paul) and an article published by the Society of Automotive Engineers entitled "Properties of Reinforced Propylene/Acid Compounds by R. A. Van Brederode, R. A. Steinkamp, K. W. Bartz, K. L. Trachte, and D. G. Steinmark, number 740292, February-March, 1974. Illustrative Examples of blends of isotactic and amorphous polypropylenes are presented in U.S. Pat. Nos. 3,073,790 and 3,483,276.

Glass fibers that have been manufactured to reinforce polymers like polyolefins have been produced with chemical treating compositions on the surfaces of the glass fibers such as those taught in U.S. Pat. Nos. 3,655,353, 3,849,148, 3,882,068, 3,814,715 (Nalley et al.). To prepare the glass fibers for reinforcing polyolefins, the aqueous chemical treating composition usually has a resinous binder which is usually an aqueous polyolefin emulsion. This emulsion can be a propylene emulsion, a polypropylene polyethylene emulsion or carboxylated polypropylene emulsion or carboxylated polypropylene-polyethylene emulsion. Also in my recent U.S. Pat. No. 4,240,944, I taught sized glass fiber strands having an aqueous chemical treating composition of an aqueous emulsion of an isotactic carboxylated polypropylene and an amorphous carboxylated polypropylene, a coupling agent, a film former and a lubricant. The aqueous emulsion of the blended polypropylenes was produced as described in U.S. Pat. No. 4,283,322 by blending the isotactic carboxylated polypropylene and amorphous carboxylated polypropylene in specific ratios with a base in an amount to produce an equivalent alkalinity to that produced by potassium hydroxide sufficient to provide a residual content of hydroxides ranging from about 16 to about 25 milligrams of hydroxide per gram of emulsion along with a surfactant and water wherein the pH of the emulsion is in the range of 8 to 9.5. The sized glass fiber strands of U.S. Pat. No. 4,283,322 performed well in reinforcing the carboxylated polypropylenes.

The basic problem with reinforcing a polyolefin matrix with glass fibers is that the polyolefin without carboxylation has no chemical moieties which can interact with any chemicals present in an aqueous chemical treating composition on the glass fibers short of degrading the polypropylene to an extent through free radical polymerization with materials in the aqueous chemical treating composition. The carboxylated polyolefin provide chemical moieties such as the carboxylate groups which can interact with chemical moieties in the aqueous chemical treating composition or its residue on the glass fibers. In reinforcing polyolefin polymers with glass fibers, the industry is always striving for stronger bonds between the glass fibers and the polyolefin matrix to provide for stronger more durable glass fiber reinforced polyolefins. This is especially true when the matrix polyolefin is an uncoupled polyolefin not having any carboxylation but rather unmodified polyolefin homopolymer. The art in striving for better reinforcement of polyolefins desires improvements in such properties as strength properties of the reinforced polyolefin and less thermal deterioration of these properties. Also, it would be beneficial in producing chemically treated glass fibers for reinforcing polyolefins to produce the chopped glass fiber strands directly during the formation of the glass fibers rather than forming the glass fibers as continuous strands in a multilayered package and subsequently wet or dry chopping the glass fibers.

It is an object of the present invention to provide chemically treated glass fibers for reinforcing polyolefins to result in more thermally and oxidatively stable glass fiber reinforced polyolefins.

It is an additional object of the present invention to provide chemically treated glass fibers for reinforcing either chemically modified or chemically unmodified polyolefin to result in glass fiber reinforced polyolefins having good mechanical properties.

SUMMARY OF THE INVENTION

The aforementioned objects and other objects gleaned from the following disclosure are accomplished by the chemically treated glass fibers of the present invention.

The chemically treated glass fibers are prepared by attenuating glass fibers from molten streams of glass issuing forth from the orifices in a bushing or similar device, treating the glass fibers with an aqueous chemical treating composition, gathering the fibers into one or more strands and collecting the strands as chopped strands or continuous strands in a multilayered package. The aqueous chemical treating composition has one or more amine organo coupling agents, an aqueous emulsion or dispersion of a carboxylic-modified polyolefin resin that has been neutralized or nearly neutralized with an organic or inorganic base, an aqueous soluble, dispersible or emulsifiable film forming polymer, and a binder stabilizer. The polyolefin can be an amorphous carboxylated polyolefin or syndiotactic carboxylic polyolefin or a mixture thereof, and functions as a co-coupler lubricant, film former and matrix resin compatibilizing material. The basicity ($K_b$) of the organic or inorganic base used to neutralize the carboxylic-containing polyolefin polymer is less than the basicity or ($K_b$) of any amino group of the coupling agent so that a reaction is promoted with effectively combined coupling agents and polyolefin co-coupler, when the treated glass fibers are dried. The reaction is a strong base weak base reaction, where an amine of the coupling agent reacts with the carboxylation of the polyolefin co-coupler. The polyolefin can be an amorphous carboxylated polyolefin or syndiotactic carboxylated polyolefin or a mixture thereof. The film forming polymer is selected from epoxy resins, polyurethane resins, polyester resins and copolymers of more than one of these resins such as epoxy polyurethanes, epoxy polyesters and the like. In the aqueous chemical treating composition, water is the major component and in the solids of the composition, the coupling agent, film forming polymer, binder stabilizer are present in effective amounts for coupling the glass fibers to the matrix resin, film formation on glass fibers for protection from interfilament abrasion, and stability to provide a useable treating composition, respectively. The emulsion of the neutralized or near neutralized carboxylic modified polyolefin is present in an effective amount to provide for chemical interaction with the coupling agent. The aqueous chemical treating composition is essentially free of low molecular weight fatty acid amides with amine groups having a total acidity of 12 to 14 percent and a pH at 25° C. of 8.5 to 9.5 and specific gravity of 1.02 as a lubricant since this material may autooxidize at elevated temperatures.

The glass fibers are formed from any fiberizable batch or indirect melt composition like "E-glass", "621-glass" or the like or any more environmentally acceptable derivatives thereof or alkaline resistant derivatives thereof. The fibers have the aqueous chemical treating composition present on a substantial portion of the surfaces of the glass fibers and the glass fibers are eventually dried to provide for a dried residue of the aqueous chemical treating composition on a substantial portion of the surface of the glass, wherein the dried residue has a loss on ignition (LOI) of less than around 2 weight percent.

These chemically treated glass fibers as chopped glass fiber or strands or continuous fibers or strands can be used to reinforce chemically modified polyolefins and unmodified polyolefin homopolymers and chemically modified and unmodified polyolefin copolymers and blends of polypropylene and polyethylene, and the like thermoplastic polymers.

DETAILED DESCRIPTION OF THE INVENTION

In the following discussion and in the claims, the term "chemically-modified polyolefins" refers to acid modified polyolefins either amorphous or crystalline in type such as those produced by the method explained in U.S. Pat. Nos. 3,416,990 (Robinson), 3,437,550 (Paul) and 3,483,276 (Mahlman), all of which are hereby incorporated by reference. In these methods, the polyolefin that is acid modified is usually polypropylene. The acid modification involves modifying the polypropylene with an ethylenically substituted carboxylic and/or polycarboxylic acids and/or anhydrides, amides or lower alkyl esters thereof. The ethylenic unsaturation is usually in the area of the carbon atom in a position alpha to at least one carboxyl group or potential carboxyl group. Examples of such acids and anhydrides include maleic acid, fumaric acid, itaconic, citraconic, acrylic acid, methacrylic acid, crotonic acid, isocrotonic acid, mesaconic acid, maleic anhydride, itaconic anhydride and citraconic anhydride. The preferred acid modifier is maleic anhydride to produce the maleonated polypropylene either of the isotactic or amorphous form. An example of the crystalline carboxylated polypropylene polymer that can be used in the emulsion to produce glass fibers of the present invention is the Hercoprime® G type resin available from Hercules, Inc., Bloomington, Del. 19899. An example of the carboxylated amorphous polypropylene polymer that can be used in the binder composition for preparing glass fibers of the present invention is commercially available as Epolene® E-43 available from Tennessee Eastman Co., Tennessee.

An aqueous emulsion is prepared from either the carboxylated amorphous polyolefin such as the carboxylated amorphous polypropylene polymer or the crystalline carboxylated polyolefin such as the crystalline carboxylated polypropylene, Hercoprime® G resin, or mixtures thereof. In addition to the presence of the polypropylene polymer, the crystalline or amorphous carboxylated polypropylenes may have up to around 25 weight percent polyethylene as a copolymer or as a polymer blend. These acid modified polyolefins can be individually emulsified by neutralizing or nearly neutralizing the polyolefin with organic or inorganic bases such as ammonia, organic amines both aliphatic and aromatic including primary, secondary and tertiary amines. The base that neutralizes the acid modified polyolefin is selected to have a basicity ($K_b$) less than the basicity of an amino organo coupling agent that will be used in the sizing composition. Nonexclusive examples of such bases include ammonia, pyridine, pyrrol, 2-amino methyl propanal, benzyl amine, N-butyl amine, T-butyl amine, cyclohexylamine, and N-decylamine, diethylamine, diisobutylamine, dimethylamine, ethylamine, ethylene diamine, hexamethylene diamine, methylamine, 3-amino pentane, 3-amino-3-methyl pentone, piperazine, 1,3-diamino propane, propylamine, diethyl ethanolamine and aniline and substituted anilines.

To form the aqueous emulsion of the amorphous or crystalline carboxylated polyolefins, any surfactants known to those skilled in the art in emulsifying polyolefins can be used. For instance, the surfactant may be any compound that is nonionic, cationic, or anionic to accomplish the purpose. Nonexclusive examples of surfactants include phenoxy polyethylene-oxy(ethanol), phenoxy (ethyleneoxy)ethanol, octylphenoxy poly(ethyleneoxy)ethanol, nonylphenoxy poly(ethyleneoxy)ethanol and other ethoxylated alkyl phenols. The amount of the surfactant used is that amount that is usually used by those skilled in the art to emulsify polyolefins.

The method of emulsifying the isotactic carboxylated polyolefin polymer or amorphous carboxylated polypropylene polymer and any carboxylated polyethylene, present, generally includes melting the proper amounts of the polyolefin in the presence of a base and with surfactants. The preferred method of emulsification includes mixing the desired amounts of the carboxylated polymer at a high temperature in the range generally of about 106° C. to about 185° C. and most preferably 170° C. to 175° C. and at superatmospheric pressures generally in the range of about 80 to about 140 psig (5.4 to 9.5 atmospheres) and preferably in the range of about 100 to about 120 psig (6.8 to 8.2 atmospheres). The mixing is performed in the presence of the base and suitable surfactants. It is preferred that the carboxylated polyolefin is the carboxylated amorphous polypropylene available under the trade designation Epolene ® E-43, and it is preferred that the base is a nitrogenous organic amine which is secondary or tertiary such as diethyl ethanolamine. The nitrogenous base is added to neutralize the acid modified polymer after which the surfactant of the desired charge, that is, cationic, anionic or nonionic is used to emulsify the neutralized polymer mixture. Suitable surfactants preferably include products such as Triton-X 100, Igepal C 0 630 and the like. After the mixture reacts and mixes well, quenching water is added to quickly cool the mixture to provide optimum product quality. The emulsion tends toward being colloidal and translucent. The emulsion is made to contain about 20 to about 40 weight percent solids.

Figure 3:
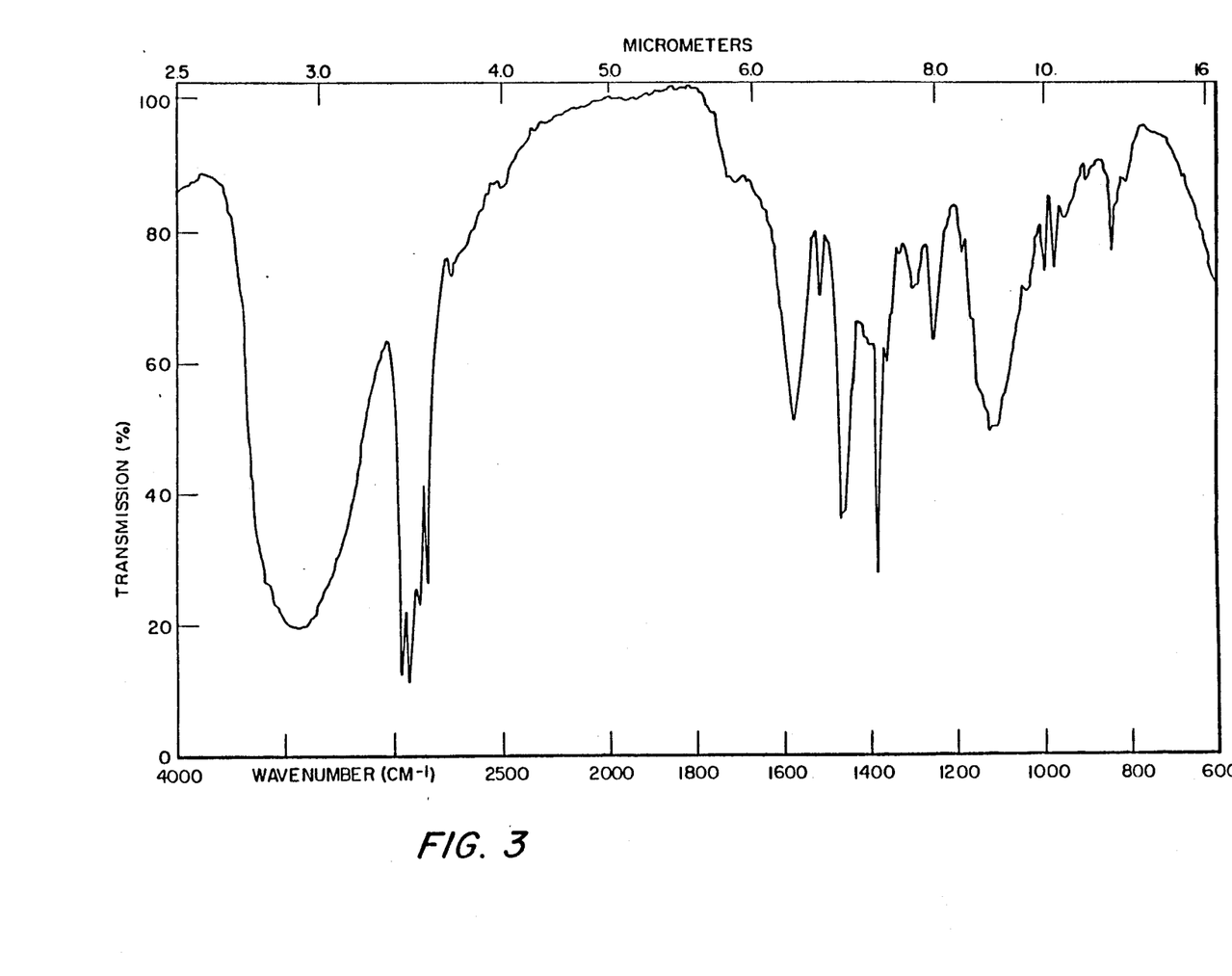
FIG. 3 is an infrared spectrophotometric curve of the dried film from the aqueous emulsion of carboxyl containing polyolefin neutralized or nearly neutralized with diethylethanolamine.
Figure 4:
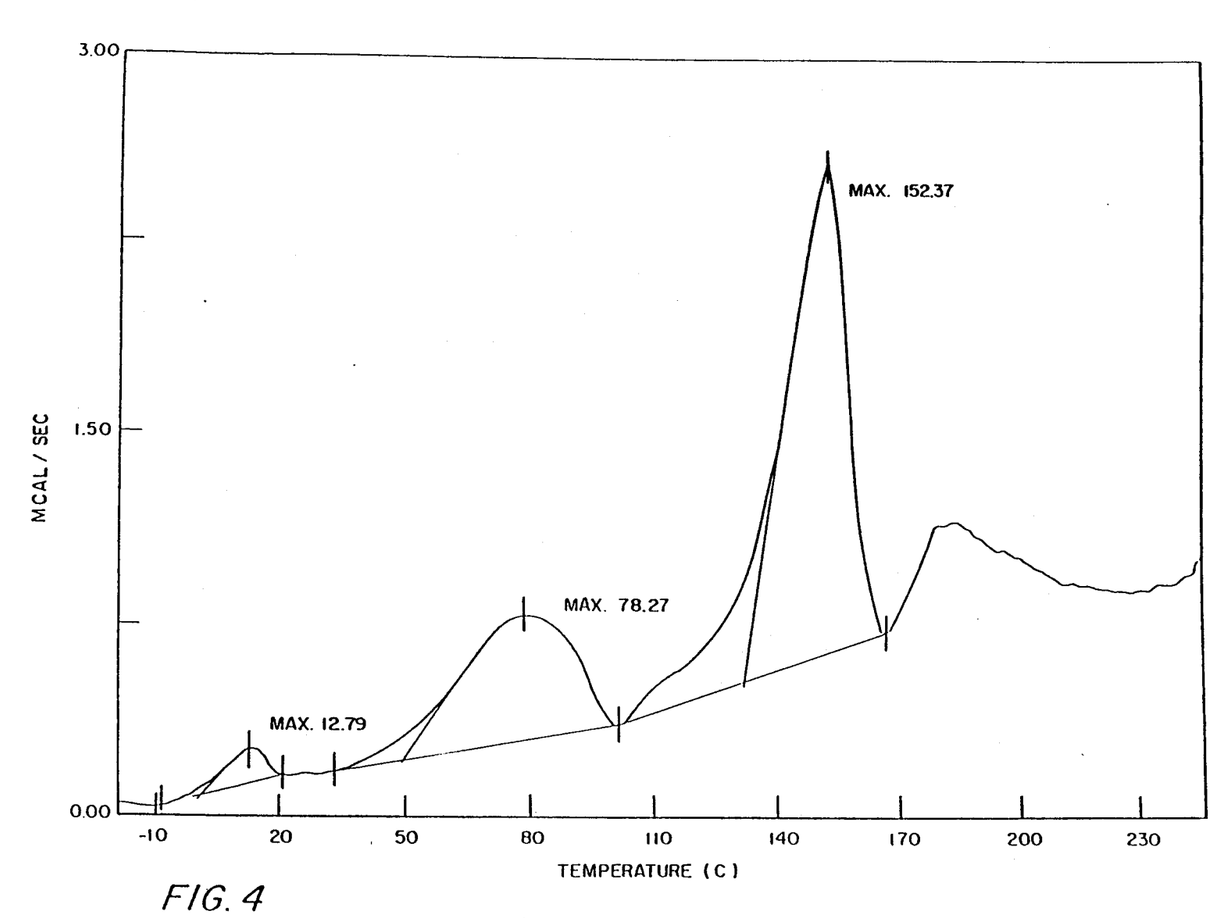
FIG. 4 is a differential scanning colorimeter curve of the emulsion of the carboxylic-containing polyolefin neutralized or nearly neutralized with diethylethanolamine.

A commercially available version of the aqueous emulsion of the carboxylated amorphous polypropylene is that from National Starch, Procter Division, under the trade designation RL-5440 polypropylene emulsion. This product has a pH of about 9.5±0.5, a solids content of 32±1, a color ranging from tan to a grey emulsion and is slightly cationic and has a boiling point of approximately 212° F. (100° C.), a specific gravity of 0.98. An example of the aqueous emulsion neutralized with diethyl ethanolamine, where the polyolefin is the carboxylated crystalline polypropylene is that product available from the Procter Division of National Starch Corporation under the trade designation RL-5140 resin emulsion. A infrared spectraphotometric curve and differential scanning colorimeter curve of the RL-5440 emulsion product are presented as FIGS. 3 and 4. The infrared spectra is obtained by preparing a dried film of the RL-5440 emulsion and placing the film in an infrared spectraphotometer where the scanning is at 12 minutes with a response of 1 in a slit program of N and an ordinate expansion of 1. The differential scanning colorimeter curve was prepared on a standard DCS machine, where the weight of the material was 10 milligrams, the scan rate was 20° per minute. The peak of FIG. 4 is from 101.45 to 166.51 with an onset of 132.18 at calories per gram of 11.35. Another peak is from 33.25 to 101.46 with an onset at 48.81 and calories per gram of 4.9. A third peak is from −8.54 to 21.04 with an onset at −0.42 and calories per gram of 0.52. The amount of the emulsion of the base-neutralized, acid-modified polyolefin ranges in the amount of about 1 to a predominant amount of the solids of the aqueous chemical treating composition. It is preferred that the emulsion is present in a predominant amount of the solids of the aqueous chemical treating composition.

The amine organo coupling agent present in the aqueous chemical treating composition can be amino organo silanes or amine containing Werner complexes. Amino organo silanes which are suitable for use in the present invention include those illustrated by the following structural formula: $[R_1-N-(R_2)-R_3]_{4-n} Si-[OR_4]_{4-N}$ wherein $R_1$ is H or an alkyl radical containing from 1 to 5 carbon atoms or H $NHCH_2-(CH_2)x-$ where X is an integer from 1 to 5, $R_2$ is H or an alkyl or acyl radical containing from 1 to 5 carbon atoms, $R_3$ and $R_4$ are alkyl radicals preferably containing 1 to 5 carbon atoms or substituted alkyl radicals, and n is a whole number from 1 to 3, preferably 1. Typical examples of these amino alkyl alkoxy silanes include gamma aminopropyltriethoxy silane and similar silanes produced in the manner described in U.S. Pat. No. 2,832,754. Other amino alkyl alkoxy silanes which may be used include gamma aminopropylmethyldiethoxy silane, delta-aminobutyl methyldiethoxy silane, and similar silanes produced in the manner described in U.S. Pat. No. 2,930,809. Also useable amino organo silanes are the diamino organo silanes such as N-beta(amino ethyl) gamma-aminopropyltrimethoxy silane, N-(trimethoxy silyl propyl)ethane diamine acrylamide and the like. Moreover, hydrolysis products of these amino alkyl alkoxy silanes may also be employed in place of or in addition to the amino-alkyl alkoxy silanes. Also polymers formed from the hydrolysis products can also be employed. The amino containing Werner type coupling agents are complex compounds in which a trivalent nuclear atom such as chromium is coordinated with an organic acid having an amino functionality. The amount of the amino organo coupling agent used in the aqueous chemical treating composition is an effective coupling amount to couple the chemically treated glass fibers to the polyolefin polymeric matrix. Preferably, the amino organo functional silane is gamma aminopropyltriethoxy silane available as A-1100 silane from Union Carbide Corporation which is present in an amount in the range of about 1 to about 10 weight percent of the solids of the aqueous chemical treating composition and from about 0.1 to about 2 weight percent of the aqueous chemical treating composition.

Also present in the aqueous chemical treating composition for the glass fibers of the present invention is one or more aqueous soluble, dispersible or emulsifiable film forming polymers. The film forming polymer is present in the aqueous chemical treating composition in an effective film forming amount to protect the glass fibers from interfilament abrasion and for chopped glass fiber strands to provide chopped strand integrity and processability. Nonexclusive examples of aqueous soluble, dispersible or emulsifiable film forming polymers that can be used include epoxy polymers, polyurethane polymers, polyester polymers and copolymers produced from a mixture of any of the monomers used in producing the aforementioned homopolymers. A suitable film forming polymer is that available under the trade designation CMD-W-60-5520 epoxy resin dispersion from Celanese Specialty Resins, Louisville, Ky. The dispersion has a viscosity in centipoise of 8,000 to 20,000, percent nonvolatiles of 59 to 61, and a density in pounds per gallon of 9.1 to 9.3, where the viscosity was measured using a Brookfield Model RVT, No. 4 spindle at 10 rpm, a weight per epoxide (on solids) of 540, an average particle size of 2 microns and pH of 4 where the volatile portion is water. The resin dispersion is completely water reducible and has an opaque viscous liquid appearance and a mild odor and a vapor pressure at 20° C. of less than 20 millimeters mercury and is an epoxy urethane dispersion of the product class epoxy dispersion. Another suitable aqueous dispersible, soluble or emulsifiable film forming polymer that can be used is a polyurethane resin dispersion available under the trade designation Witcobond W-290H available from Witco Chemical Company. The Witco W-290H urethane dispersion is a water based urethane dispersion which has a milky white appearance and is of the aliphatic type having a percent solids of 65, a density in pounds per gallon of 8.91, a flashpoint of greater than 100° C., a particle charge of anionic, a particle size in micrometers of less than 5, a pH at 25° C. (77° F.) of 7.5, a viscosity at 20° C. (77° F.) Brookfield LVF in centipoise of 200, a surface tension in dynes per centimeter of 42.

Another series of suitable film forming polymers which can be used in combination with the previously described polyurethane film forming polymer are the aqueous polyurethane dispersions available under the trade designation XW 110, XW114, and XW115 from Mobay Chemical Corporation. The dispersions are hazy off-white anionic dispersions of an aliphatic polyester polyurethane polymer in water and N-methyl-2-pyrrolidone. They range at about 35 weight percent solids, and have cosolvent content of about 15 weight percent, and have density in pounds per gallon at 25° C. of around 8.7 and have a specific gravity at 25° C. at 1.04, a viscosity in centipoise at 25° C. at 130 and a pH of 8.3. The aqueous dispersible, soluble or emulsifiable film forming polymer is essentially free of any polyvinyl acetate homopolymer. The preferred film forming polymer is the epoxy polyurethane dispersion available from Celanese Specialty Resins Company under the trade designation CMDW-W60-5520. The amount of the film forming polymer can range from about 1 to about 20 weight percent of the solids of the aqueous chemical treating composition but most preferably is present in a minor amount compared to the amount of the emulsion of the base neutralized acid modified polyolefin emulsion.

Also present in the aqueous chemical treating composition is a binder stabilizer in an effective amount to stabilize the aqueous chemical treating composition and facilitate the formation of an interaction product between the amino organo functional coupling agent and the acid modified polyolefin. It is believed but the present invention is not limited by this belief that the stabilizer can act as a secondary coupler to improve the stability of the aqueous chemical treating composition and to assist in crosslinking and to improve the coupling agent and resin to fiber interface, and in addition, assist the action of the amino organo coupling agent with the co-coupler. This assistance is by reaction of the binder stabilizer with the weaker base used to neutralize the co-coupler, when the weaker base is displaced by the amino group of the amino-organo coupling agent. Nonexclusive examples of the stabilizer include the ethylenically unsaturated carboxylic acids or anhydrides such as maleic acid or anhydride, fumaric acid or anhydride, succinic anhydride, phthalic anhydride and those aforementioned dicarboxylic acids used to acid modify the polyolefins, and saturated dicarboxylic acids and anhydrides including aliphatic aromatic and cyclic organic acids such as benzoic acid, terephthalic acid and the like. A suitable amount of the stabilizer has been found to be about 1 to about 15 weight percent of the solids of the aqueous chemical treating composition. A preferred amount of the stabilizer has been found to be about ½ of the amount of the coupling agent.

The aqueous chemical treating composition can have additional additives which are typically added to aqueous chemical treating compositions known as sizing compositions for application to glass fibers except for the presence of certain cationic lubricants. The aqueous chemical treating composition is essentially free of any cationic lubricant which is a reaction product of fatty acid amides and polyamines having a total acidity of 12 to 14 percent and a pH at 2% at 25° C. of 8.5 to 9.5 as exemplified by the cationic lubricant available from ICI International under the trade designation Cirrasol. Additional additives that may be present include softeners and surfactants and the like. The softener may be any material that softens the dried sizing composition on the glass fiber strand, modifies drape, decreases scrupiness of the glass fibers and contributes to lubricity of the strand. Preferred softeners are the polyethylene imine derivatives. A surfactant would act as a wetting agent, emulsifier and detergent to maintain the aqueous chemical treating composition as an emulsion and prevent buildup of solids on application apparatus. Among suitable surfactants are condensates formed by condensing propylene oxide and propylene glycol such as those disclosed in U.S. Pat. Nos. 2,674,619. Also a wetting agent may be present which is cationic or nonionic that may serve as an additional lubricant.

Water is present in the aqueous chemical treating composition to give a total solids (non-aqueous content) of the aqueous chemical treating composition in the range of about 1 to about 25 weight percent and preferably about 3 to about 8 weight percent. In all events, the amounts of the various components should not exceed that amount which will cause the viscosity of the solution to be that which causes difficulties in treating glass fibers. Generally, solutions having viscosities greater than 100 centipoise at 20° C. are very difficult to apply to glass fibers during their formation with standard type applicator equipment without breaking the continuity of the strand. It is preferred that the viscosity of the aqueous chemical treating composition be between about 1 and 20 centipoise at 20° C. for best results. Generally, the pH of the aqueous chemical treating composition is around slightly less than neutral to slightly greater than neutral and preferably in the range of about 7.5 to 8.5.

It is believed that the selection of the proper basicity for the base used in neutralizing the acid modified polyolefin and the proper aminoorgano functional coupling agent allows for the formation of interaction product upon reduction of the moisture of the chemically treated glass fibers. The selection of the basicity such that the neutralizing base is a weaker base than the amine group on the organo functional coupling agent allows for a base substitution reaction to form an interaction product between the amino organo functional coupling agent and the acid modified polyolefin.

For example, aliphatic amines, primary, secondary or tertiary have $K_b$ values in the order of $10^{-3}$ to $10^{-4}$ and are stronger bases than ammonia which has a $K_b$ of $1.8 \times 10^{-4}$ which is a stronger base than aromatic amines which have a $K_b$ of $10^{-9}$ or less. If the ammonia or aromatic amine is used to neutralize the acid modified polyolefin and an amino organo functional coupling agent is used having a primary, secondary or tertiary amine, the interaction product could be formed by the primary, secondary or tertiary amino group of the coupling agent displacing the nitrogenous ammonia base or aromatic amine in the salt-type reaction with the acid group of the polyolefin. Likewise, if a secondary or tertiary amine is used to neutralize the acid modified polyolefin and amino organo functional coupling agent which has a primary amine is used, the primary amine of the coupling agent would displace the secondary or tertiary amine group by the reaction of a base on a salt to form a new salt interaction product between the coupling agent and the polyolefin.

The aqueous chemical treating composition can be prepared in any manner that effectively combines the base neutralized polyolefin emulsion and the amino organo coupling agent to favor the reaction of the base on the salt when water is removed from the glass fibers. A nonexclusive example of one method of forming the aqueous chemical treatment is the following preferred preparation procedure.

In forming the aqueous chemical treating composition, the emulsion of the base neutralized acid modified polyolefin is diluted with water at an ambient temperature range of about 55° F. (12.8° C.) to about 85° F. (29.4° C.) in a main mix tank in a ratio of about 1 part of the emulsion to 10 parts of water with low to moderate stirring for less than about 5 minutes. The amino organo functional coupling agent is added at a low to moderate speed with stirring to the diluted polyolefin emulsion at a similar temperature. The mixture may thicken slightly but will eventually thin out. The binder stabilizer in a finely divided form is slowly added to the mixture. Once again, the mixture may thicken but will eventually thin out with continued stirring. In a premix tank, the film forming polymer or an emulsion of the film forming polymer is diluted with warm water in a ratio of about 1 to 3 parts water with low to moderate stirring for about 5 minutes. The dilution is added to the main mix. Any remaining water to make up the desired volume is added at ambient temperature with stirring. Preferably, the water that is used is deionized water.

The glass fibers to be treated with the aqueous chemical treating composition can be formed by any method from any fiberizable glass composition known to those skilled in the art. A preferred method of producing the chemically treated fibers is to attenuate the fibers, treat them with the aqueous chemical treating composition and gather the treated fibers into one or more strands and chop the fibers during the attenuation process. The attenuation is provided by rollers which pull the glass fibers and deliver them to the chopping apparatus. The wet chop glass fiber strands or the continuous glass fiber strands in a multilayered package or post chopped multilayered strands are dried to reduce the moisture content of the treated glass fibers. The glass fibers whether prepared by the wet chop method or the continuous strand method are attenuated at such a speed that the amount of aqueous chemical treating composition is applied by an apparatus to the fibers is in the range of less than 2 percent loss on ignition (LOI). Preferably, the LOI percentage is in the range of 0.6 to 0.9. The chemically treated glass fibers in the form of wet chopped glass fiber strands or continuous lengths of glass fibers strands in a multilayered package as formed or chopped wet are dried to reduce the moisture on the glass fibers and set the cure of the binder. The drying can be conducted at elevated temperatures for a shorter period of time or lower temperatures for longer periods of time to reduce the moisture content to facilitate an acceptable level of cure of the sized glass fiber strands. Preferably, the moisture content before drying in the range of about 8 to 12 weight percent of the glass fiber strand. The drying at elevated temperatures can occur by any method in any apparatus and at any conditions known to those skilled in the art. The glass fibers that are produced into multilayered packages subsequently chopped wet and dried via an appropriate process, or dried and dry chopped, can be dry chopped compounded into the polyolefin polymer matrix to prepare reinforced polyolefin materials. Also the glass fibers can be dispersed in the form of a mat by any mat making method known to those skilled in the art and treated as fibers with the aqueous chemical treating composition or treated as mat with the aqueous chemical treating composition.

The chemically treated glass fibers in the chopped or continuous or mat form may be utilized to reinforce any polymeric resin article. However, the instant fibers find greater functionality in the reinforcement of polyolefin polymers such as polyethylene, 5-methyl pentene and 2-methyl pentene homopolymers and copolymers and polypropylene homopolymer and polypropylene polyethylene copolymers and blends and acid modified polypropylene and polyethylene blends and acid modified polypropylene. A preferred polyolefinic polymer for utilization with the instant chemically treated glass fiber strand is polypropylene homopolymer since this polymer associates very well with the instant chemically treated glass fibers and is of relatively low cost and gives good strength properties when reinforced with the glass fibers of this invention. Generally, the ratio of polypropylene to glass may be selected in any ratio that gives the desired properties to the finished fiber reinforced plastic article. A ratio of about 10 to about 50 percent glass by weight is suitable. A preferred amount is about 20 to about 45 weight percent of glass in the molded fiber reinforced polypropylene article to give a good balance of cost properties and structural strength.

PREFERRED EMBODIMENT OF THE INVENTION

In the preferred embodiment, chemically treated glass compositions of the "621-glass" composition are prepared in a wet chop method for use in reinforcing polypropylene homopolymer. The preferred aqueous chemical treating composition has the components and amounts as listed in Table 1 and which has the properties listed in Table 1.

TABLE 1

| Ingredient | Grams As Is | % As Is | Grams Solids | % Solids of Total Solids | % Solids of Binder |
| --- | --- | --- | --- | --- | --- |

TABLE 1-continued

| | | | | | |
|---|---|---|---|---|---|
| Water | 14.5 | | | | |
| Base Neutralized Carboxylated Polypropylene Emulsion RL-5440 | 1514 | 8.00 | 484.480 | 46.12 | 2.56 |
| Gamma-aminopropyltriethoxy silane A-1100 | 397.0 | 2.10 | 240.701 | 22.90 | 1.27 |
| Maleic Acid | 98.4 | 0.52 | 98.400 | 9.36 | 0.52 |
| Water | 1.5 | | | | |
| Epoxy-polyurethane copolymer emulsion CMD W-60-5520 | 378.5 | 2.00 | 227.100 | 21.62 | 1.20 |
| Water to dilute to 18.9 liters | | | | | |
| Totals | 2387.9 | 12.62 | 1050.681 | 100.00 | 5.55 |
| | pH | | | 8 ± .25 | |
| | Solids, % | | | 5.5 ± .15 | |
| | Viscosity, cps | | | 6.0 ± 2.5 | |
| | Specific Gravity | | | 1.005 ± .002 | |
| | Moisture, % | | | 8 to 14 | |

DRIED AT TEMPERATURE AND DWELL TIME CONDITIONS TO PRODUCE THE FOLLOWING PROPERTIES:

| | | |
|---|---|---|
| Chop Length, inches | ⅛" | 3/16" |
| Bulk Density, PCF | 37 minimum | 35 minimum |
| FF, in secs. (1 Kg) | 5" maximum | 8" maximum |
| Final Dry LOI, % | .77 ± .13 | .77 ± .13 |

The aqueous chemical treating composition of Table 1 was prepared as described earlier for the preparation of the aqueous chemical treating composition.

The aqueous chemical treating composition is applied to the glass fibers having a filament diameter ranging preferably from about 5 to about 25 microns. The aqueous chemical treating composition is applied so that the final dried LOI of the glass fiber strand is in the range of about 0.6 to about 0.9 weight percent. The glass fibers are constructed into strands having a construction which preferably is of a single end type. In the wet chop process, the glass fibers are chopped into preferably ⅛ or 3/16 inch at a forming moisture content in the range of about 8 to about 14. Also the chopped glass fiber strands have the preferred bulk density, filament flow as shown in Table 1.

The bulk density test measures slip flow characteristic in relation to compaction of the chopped glass fiber strands. Compaction comes into play in molding reinforced thermoplastic polymeric materials. The bulk density is measured by filling a test tube with a known volume of chopped glass fiber strands. The test tube is placed on a shaker and the volume occupied by the strands after shaking is recorded. Higher volumes indicate better bulk density.

The filament flow test was conducted by placing a given quantity of chopped glass fiber strands either dry chopped or dry wet chopped in a funnel equipped for vibration. The time it took the total weight to pass through the funnel was recorded.

To further illustrate the invention reference is directed to the following examples.

EXAMPLES

In Examples 1 through 4 of Table 2, there are shown four various aqueous chemical treating compositions for treating glass fibers.

TABLE 2

AQUEOUS CHEMICAL TREATING COMPOSITIONS FOR GLASS FIBERS

| | Examples | | | | |
|---|---|---|---|---|---|
| Sizing Components | 1 | 2 | 3 | 4 | 5 |
| | (Quantities are in gms/5 gallon mixes) | | | | |
| Gamma aminoproplytriethoxy silane A-1000 silane | — | — | 397 | — | 350 |
| N-beta (Aminoethyl) gamma-aminopropyltrimethoxy silane (A-1120) | 400 | 302.8 | — | 293.2 | — |
| Maleic acid | 130 | 98.4 | 98.4 | 95.4 | 60 |
| Water | 8000 | 8000 | 8000 | 8000 | 8000 |
| 1 Normal hydrochloric acid | 10 | 7.6 | — | — | — |
| Epoxy polyurethane copolymer (CMD W60-5520) | 500 | 378.5 | 378.5 | — | 500 |
| Water | 500 | 500 | 500 | 500 | 500 |
| Aqueous emulsion of chemically coupled polypropylene neutralized with diethylethanolamine (RL-5440) | 2000 | 1514 | 1514 | 1470 | 1500 |
| Aqueous emulsion of polyurethane resin (Witco W290H) | — | — | — | 340 | — |
| Epoxy crosslinking agent (Witco XW) | — | — | — | 19.5 | — |
| Water | — | — | — | 500 | — |
| pH | 7.82 | 5.58 | 8.34 | 7.8 | 9.5 |
| Solids | 7.43 | 5.4 | 5.9 | 5.6 | 5.7 |

Glass fibers having a filament diameter of 13.34 (K fibers) were prepared in a wet chop process with the aqueous chemical treating compositions of Example 1, 2, 3 and 4 and a 1:1 blend of Examples 3 and 4 as Example 5 in a strand construction of a single end in a wet chop operation. These chopped glass fibers were formed at a percentage moisture in the range of around 8 to 14 percent and dried to give the handling properties listed in Table 1. The chopped glass fiber strand was used to reinforce a polypropylene polymer matrix available under the trade designation Profax® 6323 PM resin, in a molding/regrind molding technique versus a 100% regrind molding technique. The molding/regrind molding technique is used to simulate the effects of thermal and attritive forces experienced by compounders during compounding prior to pelletization and subsequent injection molding process attrition in producing reinforced polypropylene articles.

Figure 2:
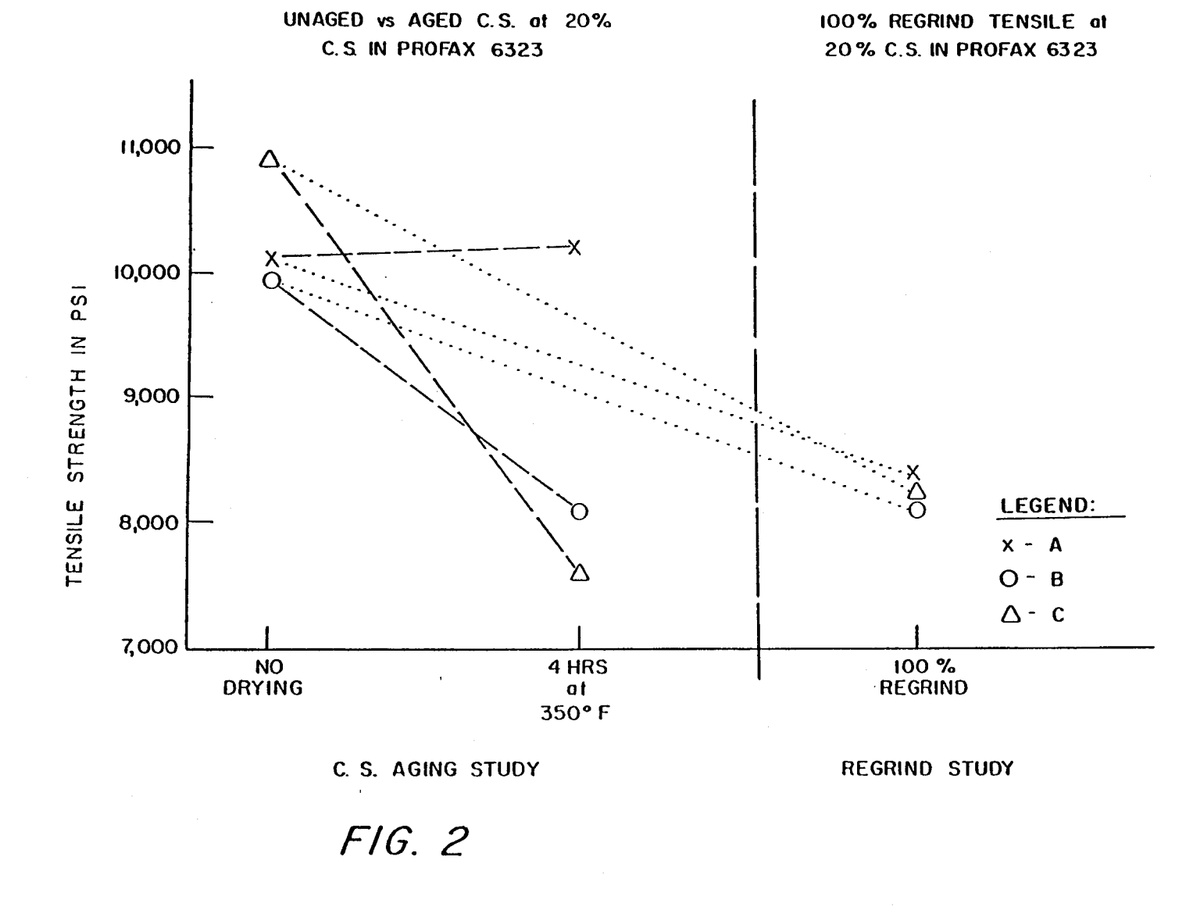
FIG. 2 is a graph depicting tensile retention of polyolefins reinforced with the unaged and thermally aged chemically treated glass fiber strands of the present invention versus polyolefins reinforced with two types of unaged and thermally aged commercially available glass fiber strands versus tensile strengths of 100% regrind material.

Table 3 shows the performance of the glass fibers of the present invention versus two types of commercial glass fiber strands sold for reinforcing polypropylene.

versus the commercial one type glass fiber strand. The strands were thermally aged at 350° F. (177° C.) prior to molding to simulate the effect of accelerated shelf aging. The analysis of data in Table 4 shows that the mechanicals of both the commercially available chopped strand products are significantly reduced by the simulated test temperatures indicating susceptibility of the binder on the commercial glass fiber strands to thermal oxidation. Thermal degradation can be noted further in FIG. 2 where the effective aging on the tensile strength is depicted. The tensiles of commercial A product, depicted by "B" of the legend, are reduced by approximately 20 percent and the tensiles of the commercial B product, depicted by "C" of the legend, by approximately 30 percent while the tensiles of the glass fibers of Example 3, depicted by "A" of the legend and the blended example, Example 5 in Table 4 lose very little or gain slightly.

TABLE 3

MECHANICAL PROPERTIES[1] DRY BLEND VS (REGRIND)[2]

| C.S. IDENTITY | % LOI | TNS. STR. PSI | FLEX. PROP. STR. PSI | FLEX. PROP. MOD. 10⁶ PSI | IMPACT STR. FPI UNI | IMPACT STR. FPI IZOD | % C.S. |
|---|---|---|---|---|---|---|---|
| ⅛" | .60 | 9100 | 12,000 | .591 | 5.64 | 1.66 | 20.3 |
| Ex 5 of Table 2 | | (7600) | (10,200) | (.549) | (3.95) | (.95) | (19.9) |
| 3/16" | .65 | 9800 | 13,600 | .603 | 6.32 | 2.22 | 21.6 |
| Ex 5 of Table 2 | | (8000) | (10,600) | (.581) | (4.33) | (1.13) | (21.0) |
| 3/16" | .72 | 9900 | 13,700 | .604 | 6.70 | 2.59 | 20.9 |
| Commercial A | | (8100) | (11,000) | (.561) | (4.66) | (1.05) | (20.1) |
| ⅛" | .90 | 10,900 | 15,400 | .670 | 7.48 | 2.83 | 21.8 |
| Commercial B | | (8200) | (11,300) | (.598) | (4.93) | (1.21) | (21.4) |
| 3/16" | .80 | 10,100 | 13,800 | .595 | 7.16 | 2.52 | 20.2 |
| Ex 3 of Table 2 | | (8400) | (11,300) | (.558) | (4.80) | (1.13) | (20.2) |
| 3/16" | .79 | 10,800 | 14,600 | .620 | 7.66 | 2.41 | 20.3 |
| Ex 4 of Table 2 | | (8500) | (11,200) | (.557) | (4.91) | (1.16) | (20.3) |

[1]Molded at 20% C.S. Content in Profax 6323 PM PP Resin (12MF) PML 1696
[2]Regrind Data in Parenthesis Represents One Regrind

TABLE 4

MECHANICAL PROPERTIES[1] UNAGED VS (AGED)[2] CHOPPED STRANDS

| C.S. IDENTITY | % LOI | TNS. STR. PSI | FLEX. PROP. STR. PSI | FLEX. PROP. MOD. 10⁶ PSI | IMPACT STR. FPI UNI | IMPACT STR. FPI IZOD | % C.S. |
|---|---|---|---|---|---|---|---|
| ⅛" | .60 | 9100 | 12,200 | .591 | 5.64 | 1.66 | 20.3 |
| Ex 5 of Table 2 | | (9200) | (11,200) | (.557) | (5.66) | (1.99) | (19.7) |
| 3/16" | .65 | 9800 | 13,000 | .603 | 6.32 | 2.22 | 21.6 |
| Ex 5 of Table 2 | | (9600) | (12,300) | (.572) | (6.27) | (2.74) | (19.3) |
| 3/16" | .72 | 9900 | 13,700 | .604 | 6.70 | 2.59 | 20.9 |
| Commercial A | | (8100) | (10,300) | (.603) | (6.17) | (2.42) | (21.5) |
| ⅛" | .90 | 10,900 | 15,400 | .670 | 7.48 | 2.83 | 21.8 |
| Commercial B | | (7600) | (9900) | (.593) | (6.91) | (2.60) | (21.6) |
| 3/16" | .80 | 10,100 | 13,800 | .595 | 7.16 | 2.52 | 20.2 |
| Example 3 | | (10,200) | (13,500) | (.594) | (6.71) | (2.48) | (20.1) |
| 3/16" | .79 | 10,800 | 14,600 | .620 | 7.66 | 2.41 | 20.3 |
| Example 4 | | (9500) | (12,700) | (.596) | (6.72) | (2.65) | (20.2) |

[1]Molded at 20% C.S. Content in Profax 6323 PM PP Resin (12MF) PML-1696
[2]Aged Data in Parenthesis. All Aged Chopped Strands were Air Aged Four Hrs. at 350° F. then Molded Against Un-Aged C.S.

As can be noted, both Examples 3 and 4 compared favorably to the commercial chopped strand products. The noted strengths of the blended example, Example 5 both at 3/16 inches and especially ⅛ inch are slightly lower than those of Example 3 and Example 4 or commercial chopped strands. The lower mechanical strengths may be due to lower LOIs which when compared with the Examples 3 and 4 chopped glass fiber strands range from approximately 20 to 25 percent lower than the Example 3 and Example 4 strands.

Figure 1:
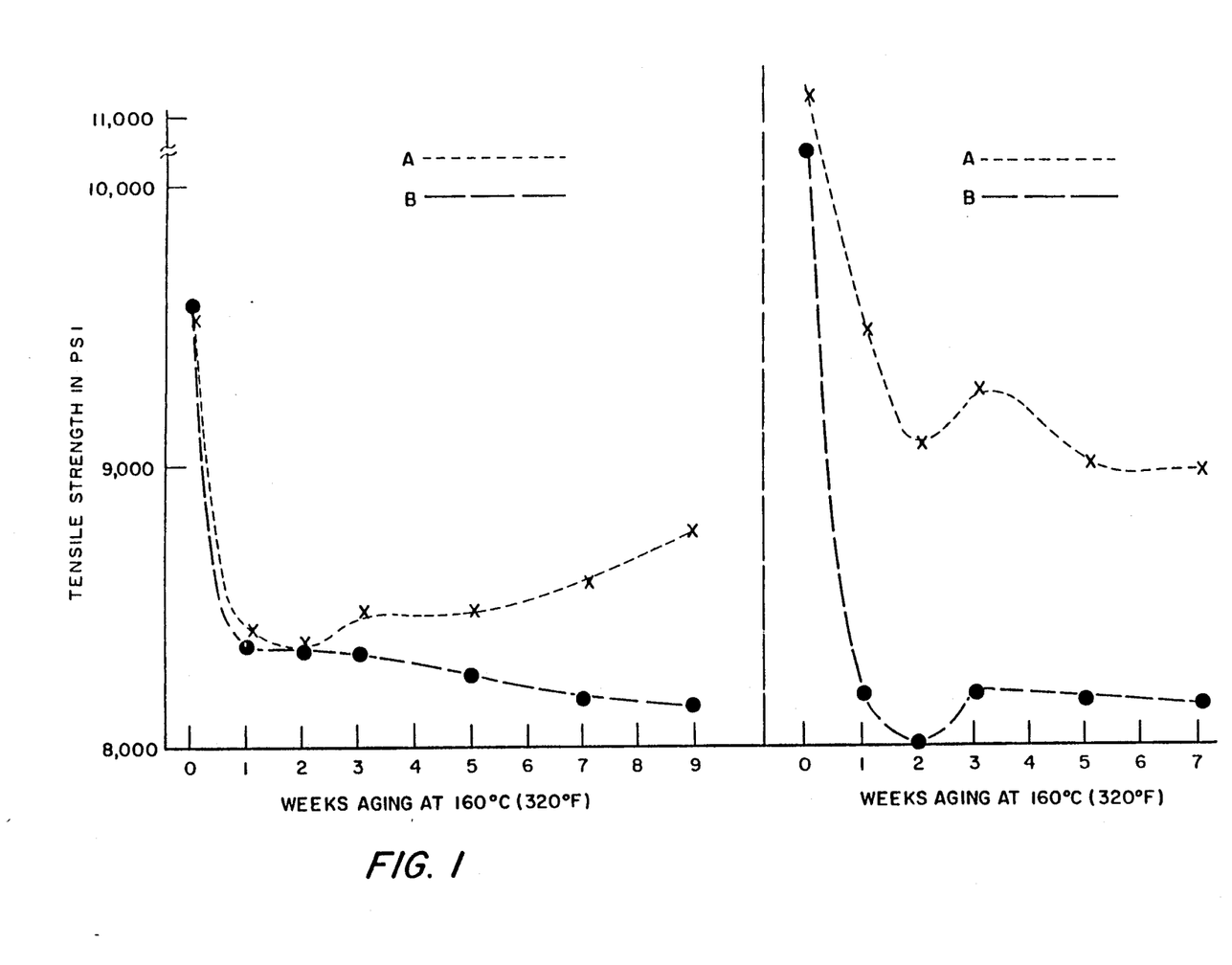
FIG. 1 is a graph of the tensile thermal aging properties of polyolefins reinforced with the chemically treated glass fiber strands of the present invention versus polyolefins reinforced with commercially available glass fiber strands.

Table 4 shows a comparison of molded mechanical properties of chopped strands of the present invention The effect of aging is further illustrated in FIG. 1 and Table 5 and Table 6. In the Tables the tensile thermal aging properties of Examples 3 and 4 are compared against those of commercial A sample in FIG. 1 Example 3 as "A" is compared with commercial A sample as "B". All three chopped strands were dry blend molded at 20 percent content in thermally stabilized polypropylene resin available under the trade designation Profax 6524 and PFO 41N available from Hercules Chemical Corporation. Molded tensiles were then exposed to an environmental air temperature at 160° C. (320° F.)±0.5° C. and tested at weekly intervals for strength retention. The tests were terminated at the noted times. The Example 3 and 4 tensiles range from approximately 8 to 10 percent higher than those of the commercial A sample.

TABLE 5

TENSILE THERMAL AGING[1] PROPERTIES[2]

| C.S. IDENTITY | TENSILE STRENGTHS AFTER AGING NOTED WEEKS | | | | | | |
|---|---|---|---|---|---|---|---|
| | 0 | 1 | 2 | 3 | 5 | 7 | 9 |
| 3/16" Example 3 | 9500 | 8400 | 8300 | 8500 | 8500 | 8600 | 8800 |
| 3/16" Example 4 | 10,000 | 8700 | 8500 | 8400 | 8400 | 8400 | 8900 |
| 3/16" Commercial A | 9600 | 8400 | 8400 | 8300 | 8300 | 8200 | 8200 |

LEGEND:
[1]Chopped Strands Direct Molded at 20% Content and Tensile Specimens Air Oven Aged at 160° C. (320° F.)
[2]Molding and Testing done under PML 1689, in Profax 6524, a Thermally Stabilized Polypropylene Resin

TABLE 6

TENSILE THERMAL AGING[1] PROPERTIES[2]

| C.S. IDENTITY | TENSILE STRENGTHS AFTER AGING NOTED WEEKS | | | | | |
|---|---|---|---|---|---|---|
| | 0 | 1 | 2 | 3 | 5 | 7 |
| 3/16" Example 3 | 11,000 | 9500 | 9000 | 9200 | 9000 | 9000 |
| 3/16" Example 4 | 11,300 | 9300 | 8800 | 9100 | 8900 | 8900 |
| 3/16" Commercial A | 10,100 | 8200 | 8000 | 8200 | 8200 | 8200 |

LEGEND:
[1]Chopped Strands Direct Molded at 20% Content and Tensile Specimens Air Oven Aged at 160° C. (320° F.)
[2]Modling and Testing done under PML 1690, in Profax PFO 41N, a Thermally Stabilized Polypropylene Resin The handling properties of glass fiber strands of Examples 3, 4, and the blended example, Example 5, compared well against those of the commercial A sample as can be shown in Table 7.

In the aforementioned tables, the tensile strength, flexural strength, flexural modulus and izod impact tests were conducted in accordance with test methods of the American Society of Testing and Materials (ASTM). These tests included respectively, D-638, D-790, D-790 and D-256.

TABLE 7

HANDLING PROPERTIES

| IDENTITY | BUSHING TIP SIZE | % LOI | B.D.[1] PCF | FF[1] IN SEC. |
|---|---|---|---|---|
| ¼" Example 5 | 2000 | .58 | 38.7 | 3.5 |
| 3/16" Example 5 | 2000 | .65 | 38.7 | 3.6 |
| 3/16" Example 3 | 2000 | .80 | 38.2 | 3.4 |
| 3/16" Example 4 | 2000 | .79 | 43.0 | 2.4 |
| 3/16" Commercial A | 2000[2] | .74 | 37.8 | 4.1 |
| ¼" Commercial B | 4000 | .90 | 45.8 | 2.6 |

LEGEND:
[1]Average of Three Tests
[2]This could be a Good Split 4000 (2/2)

I claim:
1. Strands of glass fibers having a dried residue of an aqueous chemical treating composition on a substantial portion of the surfaces of the glass fibers, wherein the aqueous chemical treating composition comprises:
   a. an interaction product of an acid modified polyolefin selection from the group consisting of maleonated amorphous polypropylene, maleonated isotactic polypropylene, maleonated polypropylene, polyethylene, polyethylene copolymer, wherein the polyethylene is present in an amount up to about 25 weight percent, and wherein the acid modified polyolefin has been neutralized with diethyl ethanolamine and the amino silane coupling agent which is an amino organo silane coupling agent having a primary amine is selected from gamma-aminopropyltriethoxy silane and N-beta (aminoethyl) gamma-aminopropyltrimethoxy silane, wherein the basicity of the amino moiety on the organo coupling agent is greater than the basicity of the diethyl ethanolamine used to neutralize the acid modified polyolefin to result in the formation of the interaction product through the reaction of the stronger base on the salt of the neutralized polyolefin,
   b. a stabilizing agent selected from the group consisting of dicarboxylic acids that are unsaturated, saturated, aliphatic or aromatic to react with the weaker base of the base neutralized polyolefin,
   c. film-forming polymers selected from the group consisting of water soluble, emulsifiable and dispersible film-forming polymers being essentially free of polyvinylacetate homopolymer, wherein the glass fibers prior to drying have a moisture content in the range of less than 20 weight percent and the dried glass fiber strands have an LOI in the range of less than 2 weight percent, and wherein the residue is essentially free of a cationic lubricant which is an amidated fatty acid formed by the reaction of fatty acids and polyamines and wherein the amount of the interaction product is the predominant amount of the dried residue.

2. Glass fibers of claim 1 having the dried residue of the aqueous chemical treating composition, where the percent moisture is reduced to an effective level to avoid polymer degradation or the development of voids when the glass fibers are used to reinforce polymeric matrices.

3. Glass fibers of claim 1 wherein the moisture content of the glass fiber prior to drying is in the range of about 8 to about 14 weight percent of the glass fibers.

4. Glass fibers of claim 3 having a percent LOI of less than 2.

5. Glass fibers of claim 3 having a percent LOI in the range of 0.6 to 0.9.

6. Glass fibers of claim 1 wherein the aqueous chemical treating composition on the glass fibers prior to drying has a pH in the range of about 7 to 9.

7. Glass fibers of claim 1 wherein the aqueous chemical treating composition on the glass fibers prior to drying has a solids content in the range of about 5 to 6 weight percent.

8. Glass fibers of claim 1 wherein the aqueous chemical treating composition on the glass fibers prior to drying has a mineral acid to reduce the pH.

9. Glass fiber strands of claim 1 wherein the amine organo coupling agent is gamma-aminopropyltriethoxy silane and the silane is present in an effective coupling agent amount.

10. Glass fibers of claim 1 wherein the film-forming polymer in the aqueous chemical treating composition is a blend of an aqueous polymeric dispersion selected from the group consisting of epoxy polyurethane blends or copolymers or a blend of an epoxy polyurethane copolymer and polyurethane polymer.

* * * * *